US009067529B2

(12) United States Patent
Takizawa et al.

(10) Patent No.: US 9,067,529 B2
(45) Date of Patent: Jun. 30, 2015

(54) ELECTRONIC KEY SYSTEM FOR VEHICLE

(75) Inventors: Ryo Takizawa, Edogawa-ku (JP); Yoshiyuki Oya, Mitaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/883,103

(22) PCT Filed: Dec. 24, 2010

(86) PCT No.: PCT/JP2010/073434
§ 371 (c)(1),
(2), (4) Date: May 2, 2013

(87) PCT Pub. No.: WO2012/086081
PCT Pub. Date: Jun. 28, 2012

(65) Prior Publication Data

US 2013/0257606 A1 Oct. 3, 2013

(51) Int. Cl.
*B60Q 1/00* (2006.01)
*B60Q 9/00* (2006.01)
*B60R 25/24* (2013.01)
*G07C 9/00* (2006.01)

(52) U.S. Cl.
CPC . *B60Q 9/00* (2013.01); *B60R 25/24* (2013.01); *G07C 9/00309* (2013.01); *G07C 2209/63* (2013.01)

(58) Field of Classification Search
None
See application file for complete search history.

(56) References Cited

U.S. PATENT DOCUMENTS

2006/0066442 A1 3/2006 Hamada
2007/0109093 A1 * 5/2007 Matsubara et al. .......... 340/5.61
2009/0066637 A1 * 3/2009 Mc Call ........................ 345/156
2010/0050713 A1 3/2010 Nagao et al.

FOREIGN PATENT DOCUMENTS

JP 2006-104664 A 4/2006
JP 2006-124935 A 5/2006
JP 2007-076415 A 3/2007
JP 2008-208525 A 9/2008
JP 2009-025123 A 2/2009
JP 2009-197508 A 9/2009
JP 2010-001642 A 1/2010
JP 2010-209642 A 9/2010

* cited by examiner

*Primary Examiner* — Tai T Nguyen
*Assistant Examiner* — Ojiako Nwugo
(74) *Attorney, Agent, or Firm* — Kenyon & Kenyon LLP

(57) ABSTRACT

An object of the invention is to provide an electronic key system for a vehicle capable of accurately detecting that an electronic key has been taken out of a host vehicle. An electronic key system for a vehicle according to the invention which allows the start of a host vehicle when an electronic key of the host vehicle is authenticated includes electronic key information acquisition means for acquiring information relating to the position of the electronic key, taking-out detection means for detecting that the electronic key has been taken out of the host vehicle on the basis of the information relating to the position of the electronic key acquired by the electronic key information acquisition means, and alarm means for providing a warning to notify that the electronic key has been taken out of the host vehicle.

4 Claims, 6 Drawing Sheets

1
18 WARNING GENERATION MEANS
3 COMMUNICATION MEANS
4 MULTIMEDIA ECU
COLLATION ECU
2 READER/WRITER
OPENING/CLOSING DETECTION MEANS 5
BODY ECU 6
7
HOST VEHICLE POSITION DETECTION MEANS 17
11
15 COMMUNICATION MEANS
13 POSITION DETECTION MEANS
IC 12
MOVEMENT LOCUS DETECTION MEANS 16
WARNING MEANS 14

START
S01
ELECTRONIC KEY IS HELD?
S02
AUTHENTICATION IS POSSIBLE?
S03
PERMIT START
S04
WITHIN TIME LIMIT?
S05
THERE IS ON OPERATION?
S06
THERE IS NO OFF OPERATION?
S07
DOOR IS OPEN?
S08
DETERMINE TAKING-OUT
S09
TAKING-OUT IS PRESENT?
S10
WARN ALARM
S11
PROHIBIT ENGINE START
END

ELECTRONIC KEY SYSTEM FOR VEHICLE

This is a 371 national phase application of PCT/JP2010/073434 filed 24 Dec. 2010, the contents of which are incorporated herein by reference.

TECHNICAL FIELD

The present invention relates to an electronic key system for a vehicle which allows the start of a host vehicle when an electronic key of the host vehicle is authenticated.

BACKGROUND ART

As an electronic key system for a vehicle of the related art, a technique is known in which an LF (Low Frequency) signal is transmitted to an electronic key, the electronic key having been taken out of the host vehicle is detected on the basis of the presence/absence of a response from the electronic key, and a warning is provided (for example, see Patent Literature 1).

CITATION LIST

Patent Literature

[Patent Literature 1] Japanese Unexamined Patent Application Publication No. 2008-208525

SUMMARY OF INVENTION

Technical Problem

However, in the electronic key system for a vehicle, there was a concern that the electronic key having been taken out of the host vehicle may not be accurately detected due to the communication environment of the electronic key. For example, there was a concern that, when there are few obstacles to communication with the electronic key, a response from the electronic key can be obtained despite the electronic key having been taken out of the host vehicle, and the taking-out of the electronic key may not be detected. There was also a concern that, when there are a large number of obstacles to communication with the electronic key, no response from the electronic key is obtained even if the electronic key is in the host vehicle, and the taking-out of the electronic key may be detected.

An object of the invention is to provide an electronic key system for a vehicle capable of accurately detecting that an electronic key has been taken out of a host vehicle.

Solution to Problem

The invention provides an electronic key system for a vehicle which allows the start of a host vehicle when an electronic key of the host vehicle is authenticated. The electronic key system includes electronic key information acquisition means for acquiring information relating to the position of the electronic key, taking-out detection means for detecting that the electronic key has been taken out of the host vehicle on the basis of the information relating to the position of the electronic key acquired by the electronic key information acquisition means, and alarm means for providing a warning to notify that the electronic key has been taken out of the host vehicle.

In the electronic key system for a vehicle, the taking-out of the electronic key is detected on the basis of the information relating to the position of the electronic key, and the warning to notify the taking-out of the electronic key is provided. For this reason, the taking-out of the electronic key can be accurately detected and the warning can be provided without depending on the communication environment of the electronic key.

Preferably, the electronic key system further includes host vehicle position detection means for detecting position information of the host vehicle, the electronic key information acquisition means acquires position information of the electronic key, and the taking-out detection means detects that the electronic key has been taken out of the host vehicle on the basis of the position information of the host vehicle detected by the host vehicle position detection means and the position information of the electronic key acquired by the electronic key information acquisition means. In this case, the taking-out of the electronic key can be simply and accurately detected on the basis of the relative position of the electronic key with respect to the host vehicle.

Preferably, the electronic key information acquisition means acquires movement locus information of the electronic key, and the taking-out detection means detects that the electronic key has been taken out of the host vehicle on the basis of the movement locus information of the electronic key acquired by the electronic key information acquisition means. In this case, the taking-out of the electronic key can be more simply detected without acquiring position information which requires a GPS or the like.

Preferably, the electronic key system further includes opening/closing detection means for detecting opening/closing of a door of the host vehicle, and the taking-out detection means detects that the electronic key has been taken out of the host vehicle on the basis of the information acquired by the electronic key information acquisition means and the opening/closing of the door detected by the opening/closing detection means. In this case, since the taking-out of the electronic key is detected on the basis of the combination of the information relating to the position of the electronic key and the opening/closing of the door, the taking-out of the electronic key can be accurately detected.

Preferably, the electronic key information acquisition means receives information relating to the position of the electronic key from the electronic key through short-range wireless communication, and the alarm means transmits information indicating that the electronic key has been taken out of the host vehicle to the electronic key through short-range wireless communication. In this case, versatile short-range wireless communication is effectively utilized, the information relating to the position of the electronic key is acquired, and information indicating taking-out is transmitted to the electronic key. For this reason, a warning can be provided to a person who takes out the electronic key, thereby reliably informing of the taking-out of the electronic key.

Advantageous Effects of Invention

According to the electronic key system for a vehicle of the invention, it is possible to accurately detect that the electronic key has been taken out of the host vehicle.

DESCRIPTION OF EMBODIMENTS

Figure 1:
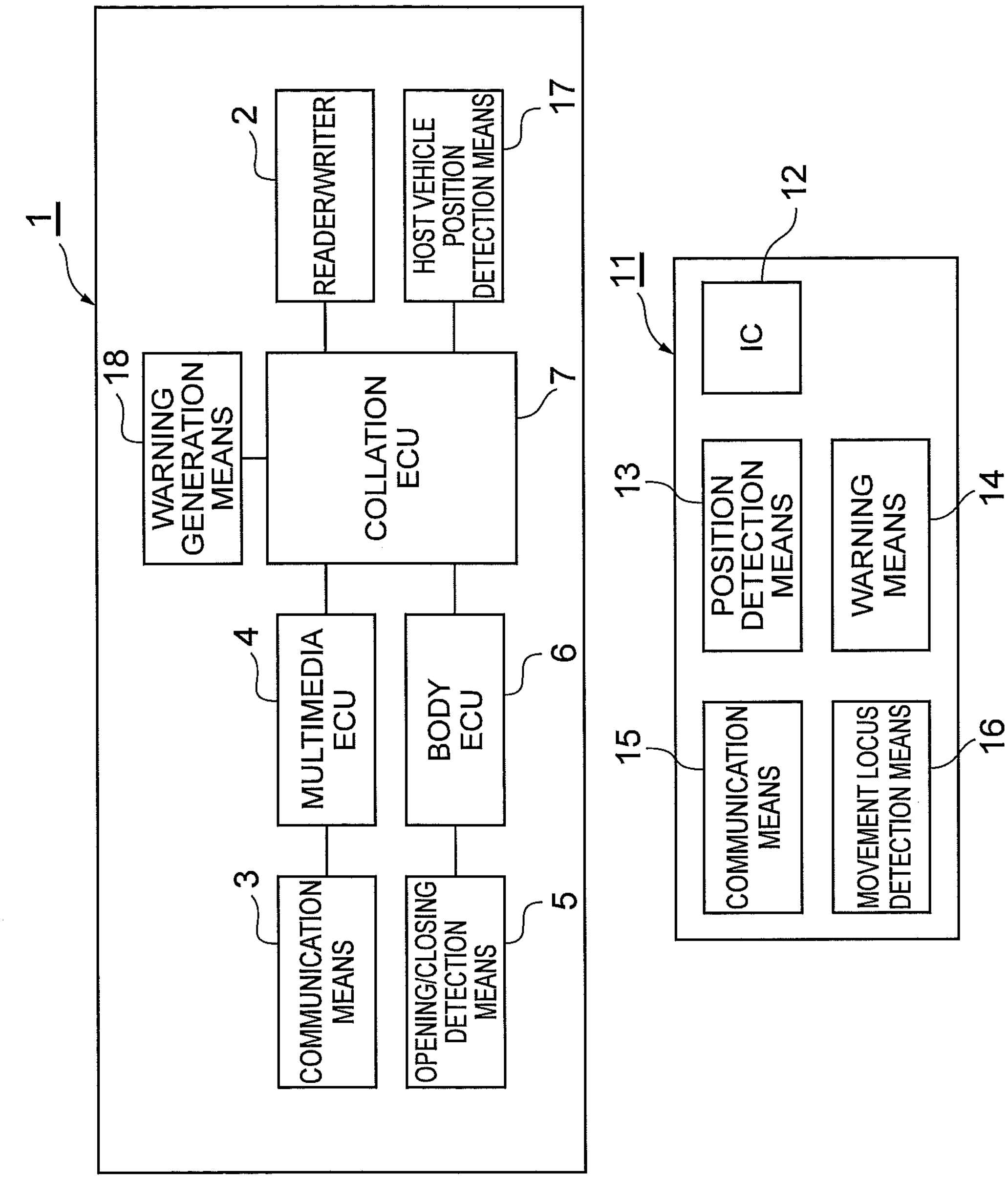
FIG. 1 is a functional block diagram showing a first embodiment of an electronic key system for a vehicle according to the invention.

Hereinafter, preferred embodiments of an electronic key system for a vehicle according to the invention will be described in detail with reference to the drawings. In the drawings, the same or equivalent components are represented by the same reference numerals, and overlapping description will be omitted.

First, a first embodiment of an electronic key system for a vehicle according to the invention will be described. As shown in FIG. 1, an electronic key 11 involved in this embodiment includes an IC 12 in which an identification code is recorded, position detection means 13 for detecting position information using a GPS or the like, warning generation means 14 for providing a warning, such as vibration or sound, communication means 15 for performing short-range wireless communication, and movement locus detection means 16 for detecting movement locus information using a G sensor or the like. The electronic key 11 is not limited to one provided specifically for a vehicle. For example, a mobile terminal, such as a mobile phone, having other uses may be used as the electronic key 11. As described below, in this embodiment, since the movement locus detection means 16 is not used, the electronic key 11 may not include the movement locus detection means 16.

The electronic key system 1 for a vehicle includes a reader/writer 2 which performs reading/writing of information with respect to the IC 12 of the electronic key 11, a multimedia ECU (Electronic Control Unit) 4 which controls the communication means 3 and performs short-range wireless communication, a body ECU 6 which controls the opening/closing detection means 5 and detects the opening/closing of a door of the host vehicle, a collation ECU 7 which controls the entire system, host vehicle position detection means 17 for detecting position and direction information of the host vehicle using a GPS or the like, and warning generation means 18 for providing a warning, such as vibration or sound.

The reader/writer 2 performs reading/writing of information with respect to the IC 12 of the electronic key 11 using a noncontact IC technique, such as FeliCa (Registered Trademark) or NFC (Near Field Communication). The communication means 3 performs short-range wireless communication with the communication means 15 of the electronic key 11 on the basis of the standard, such as Bluetooth (Registered Trademark).

Figure 2:
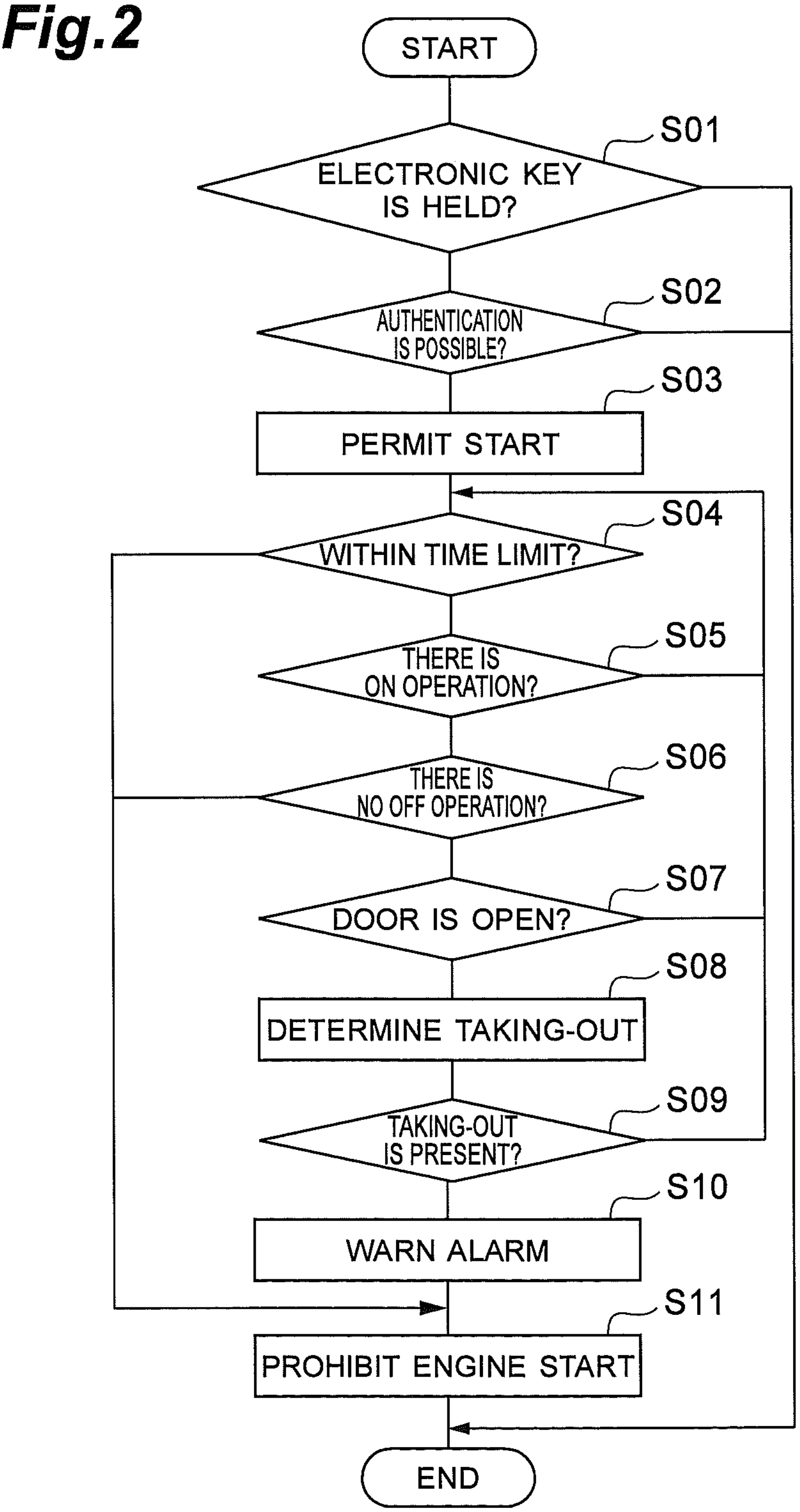
FIG. 2 is a flowchart showing a procedure of providing a warning according to taking-out of an electronic key.

The collation ECU 7 detects the taking-out of the electronic key 11 through a control procedure shown in FIG. 2, and provides a warning. First, it is determined whether or not the electronic key 11 is held over the reader/writer 2 (Step S01). When it is determined that the electronic key 11 is not held over the reader/writer 2, the processing ends.

When it is determined that the electronic key 11 is held over the reader/writer 2, the identification code recorded in the IC 12 of the electronic key 11 is acquired, and it is determined whether or not the electronic key 11 is the electronic key of the host vehicle (Step S02). When it is determined that the electronic key 11 is not the electronic key of the host vehicle, and the electronic key 11 is not authenticated as the electronic key of the host vehicle, the processing ends.

When it is determined that the electronic key 11 is the electronic key of the host vehicle, and the electronic key 11 is authenticated as the electronic key of the host vehicle, the start of the host vehicle is permitted (Step S03). If the start of the host vehicle is permitted, an input to a start switch in the vehicle is validated and a start operation, such as accessory ON or ignition ON, becomes possible. Subsequently, the elapsed time after the start of the host vehicle is permitted is confirmed, and it is determined whether or not the elapsed time is within a time limit (Step S04). When it is determined that the elapsed time exceeds the time limit, the start of the host vehicle is prohibited (Step S11), and the processing ends.

When it is determined that the elapsed time is within the time limit, it is determined whether or not an ON operation (for example, accessory ON, ignition ON, or the like) to start the power source of the host vehicle is performed (Step S05). When it is determined that the ON operation is not performed, the processing returns to Step S04.

When it is determined that the ON operation is performed, it is determined whether or not an OFF operation (for example, accessory OFF, ignition OFF, or the like) to stop the power source of the host vehicle is performed (Step S06). When it is determined that the OFF operation is performed, the start of the host vehicle is prohibited (Step S11), and the processing ends.

When it is determined that the OFF operation is not performed, it is determined whether or not a door of the host vehicle is open on the basis of the opening/closing of the door detected by the body ECU 6 (Step S07). When it is determined that the door is not open, the processing returns to Step S04.

When it is determined that the door is open, the taking-out of the electronic key 11 is determined through a procedure described below (Step S08). In this way, the collation ECU 7 operates as taking-out detection means for detecting that the electronic key 11 has been taken out of the host vehicle. Subsequently, the presence/absence of the taking-out of the electronic key 11 is determined on the basis of the determination result of the taking-out of the electronic key 11 (Step S09). When it is determined that the taking-out of the electronic key 11 is not present, the processing returns to Step S04.

When it is determined that the taking-out of the electronic key 11 is present, the warning generation means 18 provides a warning to notify the taking-out of the electronic key 11 (Step S10). The multimedia ECU 4 transmits information indicating the taking-out of the electronic key 11 to the communication means 15 of the electronic key 11. When receiving the information indicating the taking-out of the electronic key 11, the electronic key 11 provides a warning using the warning generation means 14. In this way, the collation ECU 7 operates as alarm means for notifying that the electronic key 11 has been taken out of the host vehicle.

If a warning to notify the taking-out of the electronic key 11 is provided, the start of the host vehicle is prohibited (Step S11), and the processing ends. The collation ECU 7 repeats the above control procedure in a predetermined period.

Figure 3:
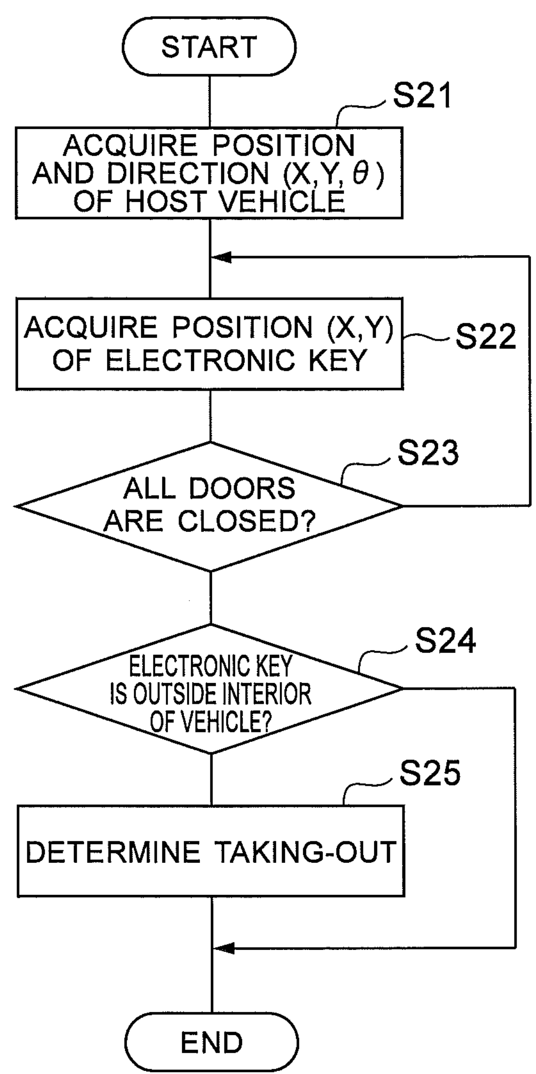
FIG. 3 is a flowchart showing a procedure of determining taking-out of an electronic key.

The collation ECU 7 performs the taking-out determination in Step S08 through the control procedure shown in FIG. 3. First, the host vehicle position detection means 17 acquires the position and direction information of the host vehicle (Step S21). Next, the position information of the electronic key 11 detected by the position detection means 13 of the electronic key 11 is acquired using the multimedia ECU 4 (Step S22). In this way, the multimedia ECU 4 is used as electronic key information acquisition means for acquiring the information relating to the position of the electronic key 11. Subsequently, it is determined whether or not all of the doors of the host vehicle are closed on the basis of the opening/closing of the door detected by the body ECU 6 (Step S23). When it is determined that any door is not closed, the processing returns to Step S22.

When it is determined that all of the doors are closed, it is determined whether or not the electronic key 11 is outside the interior of the host vehicle on the basis of the position and direction information of the host vehicle and the position information of the electronic key 11 (Step S24). When it is determined that the electronic key 11 is within the interior of the host vehicle, the processing ends.

Figure 4:
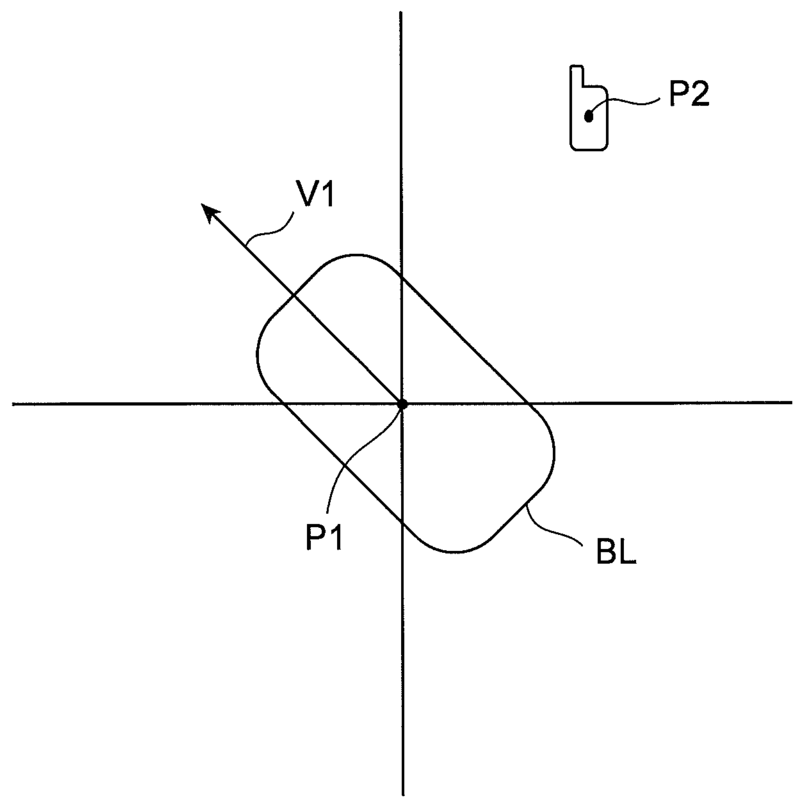
FIG. 4 is a diagram showing a situation in which taking-out of an electronic key is detected through the procedure of FIG. 3.

When it is determined that the electronic key 11 is outside the interior of the host vehicle, it is specified that the electronic key 11 is taken out of the host vehicle (Step S25), and the processing ends. A case where it is determined the electronic key 11 is outside the vehicle interior will be described with reference to FIG. 4. FIG. 4 shows a state where a position P1 and a direction V1 of the host vehicle are acquired, and a position P2 of the electronic key 11 is acquired. A boundary BL in FIG. 4 represents the boundary between inside and outside the vehicle interior. The boundary BL is calculated on the basis of the position P1 and the direction V1. In FIG. 4, the position P2 is outside the range of the boundary BL, and it is determined that the electronic key 11 is outside the vehicle interior.

In the electronic key system 1 for a vehicle configured as above, the taking-out of the electronic key 11 is detected on the basis of the combination of the position and direction information of the host vehicle, the position information of the electronic key 11, the opening/closing of the door, and a warning to notify the taking-out of the electronic key 11 is provided. For this reason, the taking-out of the electronic key 11 can be accurately detected and a warning can be provided without depending on the communication environment of the electronic key 11.

In the electronic key system 1 for a vehicle, versatile short-range wireless communication is used, and information indicating taking-out is transmitted to the electronic key 11. For this reason, a warning can be provided to a person who takes out the electronic key 11, thereby reliably informing of the taking-out of the electronic key 11.

Next, a second embodiment of an electronic key system for a vehicle according to the invention will be described. The second embodiment is different from the first embodiment in that, in the taking-out determination of the electronic key 11, the movement locus information detected by the movement locus detection means 16 of the electronic key 11 is used instead of the position information detected by the position detection means 13 of the electronic key 11. Accordingly, the electronic key 11 involved in this embodiment may not include the position detection means 13. The movement locus information of the electronic key 11 is included in the information relating to the position of the electronic key 11.

Figure 5:
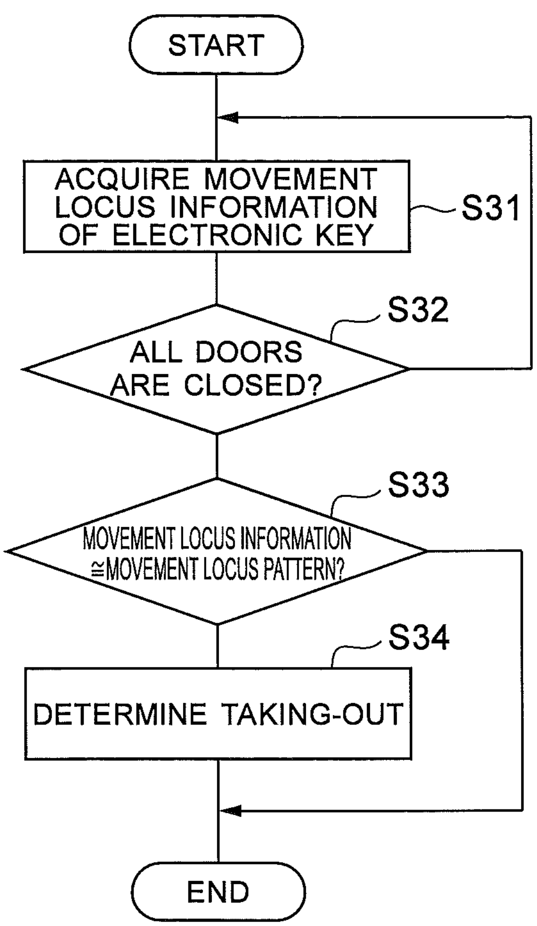
FIG. 5 is a flowchart showing a procedure of determining taking-out of an electronic key which is executed in a second embodiment of the invention.

The collation ECU 7 of the second embodiment performs the taking-out determination of the electronic key 11 through a control procedure shown in FIG. 5. First, the multimedia ECU 4 acquires the movement locus information of the electronic key 11 detected by the movement locus detection means 16 of the electronic key 11 (Step S31). When the movement locus detection means 16 integrates an acceleration to calculate the movement locus, the start of integration of the acceleration is instructed to the electronic key 11 at a predetermined timing. The predetermined timing is the time when the electronic key 11 is authenticated as the electronic key of the host vehicle, the time when the host vehicle stops in an idling state, or the like.

Subsequently, it is determined whether or not all of the doors of the host vehicle are closed on the basis of the opening/closing of the door detected by the body ECU 6 (Step S32). When it is determined that any door is not closed, the processing returns to Step S31.

When it is determined that all of the doors are closed, the acquired movement locus information is compared with a movement locus pattern which is drawn when the electronic key 11 is taken out, and it is determined whether or not the acquired movement locus information resembles the movement locus pattern (Step S33). The movement locus pattern is accumulated in a data storage device in the interior in advance. When it is determined that the acquired movement locus information does not resemble the movement locus pattern, the processing ends.

Figure 6:
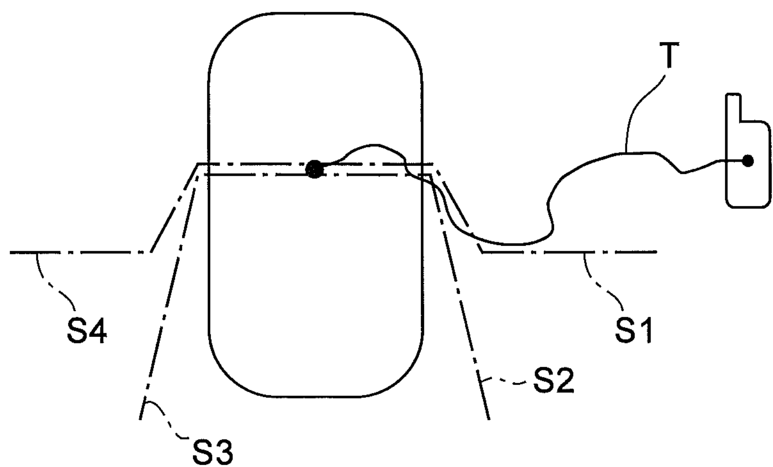
FIG. 6 is a diagram showing a situation in which taking-out of an electronic key is detected through the procedure of FIG. 5.

When it is determined that the acquired movement locus information resembles the movement locus pattern, it is determined that the electronic key 11 is taken out of the host vehicle (Step S34), and the processing ends. A case where it is determined that the acquired movement locus information resembles the movement locus pattern will be described with reference to FIG. 6. FIG. 6 shows a state where movement locus information T of the electronic key 11 is acquired, and movement locus patterns S1 to S4 are stored in the data storage device in the interior. In FIG. 6, it is determined that the movement locus information T resembles the movement locus pattern S1.

According to the second embodiment, the taking-out of the electronic key 11 can be detected without using a GPS. For this reason, the taking-out of the electronic key 11 can be detected without depending on the reception situation of the GPS.

Although the preferred embodiments of the invention have been described, the invention is not limited to the foregoing embodiments, and various alterations may be made without departing from the scope of the invention. For example, the electronic key system for a vehicle may use the combination of the position information of the electronic key and the movement locus information of the electronic key in the taking-out determination of the electronic key. In this case, two kinds of information are used in a complementary manner, thereby more accurately detecting the taking-out of the electronic key. For example, when the reception environment of the GPS is worse, and the position information of the electronic key cannot be accurately acquired, the movement locus information of the electronic key is used, thereby accurately determining the taking-out of the electronic key.

INDUSTRIAL APPLICABILITY

According to the invention, it is possible to provide an electronic key system for a vehicle capable of accurately detecting that an electronic key has been taken out of a host vehicle.

REFERENCE SIGNS LIST

1: electronic key system for vehicle, 2: reader/writer, 3: communication means, 4: multimedia ECU (electronic key information acquisition means), 5: opening/closing detection means, 6: body ECU, 7: collation ECU (taking-out detection means, alarm means), 17: host vehicle position detection means.

The invention claimed is:

1. An electronic key system for a vehicle which allows start of a host vehicle when an electronic key of the host vehicle is authenticated, the electronic key system comprising:

an electronic key information acquisition unit configured to acquire movement locus information calculated by integrating an acceleration of the electronic key;

an opening/closing detection unit configured to detect opening/closing of a door of the host vehicle;

a taking-out detection unit configured to detect that the electronic key has been taken out of the host vehicle on basis of the movement locus information acquired by the electronic key information acquisition unit when the opening/closing detection unit detects that the door of the host vehicle is open after a power source of the host vehicle starts and further detects that all doors of the host vehicle are closed;

and an alarm unit configured to transmit information indicating that the electronic key has been taken out of the host vehicle to said electronic key through short-range wireless communication, and induce the electronic key that received the information indicating that said electronic key has been taken out of the host vehicle to provide a warning.

2. The electronic key system according to claim 1, further comprising:

a host vehicle position detection unit configured to detect position information of the host vehicle, wherein the electronic key information acquisition unit acquires position information of the electronic key, and the taking-out detection unit detects that the electronic key has been taken out of the host vehicle on the basis of the position information of the host vehicle detected by the host vehicle position detection unit and the position information of the electronic key acquired by the electronic key information acquisition unit.

3. The electronic key system according to claim 1, wherein the electronic key information acquisition unit receives information relating to the position of the electronic key from the electronic key through short-range wireless communication.

4. The electronic key system according to claim 2, wherein the electronic key information acquisition unit receives information relating to the position of the electronic key from the electronic key through short-range wireless communication.

* * * * *